United States Patent
Sharma et al.

(10) Patent No.: US 9,009,061 B2
(45) Date of Patent: Apr. 14, 2015

(54) COOLING RESOURCE CAPACITY ALLOCATION BASED ON OPTIMIZATION OF COST FUNCTION WITH LAGRANGE MULTIPLIERS

(75) Inventors: Ratnesh Kumar Sharma, Union City, CA (US); Amip J. Shah, Santa Clara, CA (US); Cullen E. Bash, Los Gatos, CA (US); Chandrakant Patel, Fremont, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 859 days.

(21) Appl. No.: 12/430,303

(22) Filed: Apr. 27, 2009

(65) Prior Publication Data

US 2009/0327012 A1      Dec. 31, 2009

(51) Int. Cl.
| | |
|---|---|
| *G06Q 10/00* | (2012.01) |
| *G06N 5/02* | (2006.01) |
| *G06Q 50/00* | (2012.01) |
| *G06Q 10/04* | (2012.01) |
| *G06Q 10/06* | (2012.01) |

(52) U.S. Cl.
CPC .......... *G06Q 10/04* (2013.01); *G06Q 10/06315* (2013.01)

(58) Field of Classification Search
CPC .......... G06Q 10/00; G06Q 50/00; G06N 5/02
USPC ...................... 705/8, 7.12; 706/46
See application file for complete search history.

(56) References Cited

U.S. PATENT DOCUMENTS

| | | | |
|---|---|---|---|
| 6,732,540 B2 * | 5/2004 | Sugihara et al. ............. 62/177 |
| 7,010,392 B2 * | 3/2006 | Bash et al. .................... 700/276 |
| 2003/0158718 A1 * | 8/2003 | Nakagawa et al. ............. 703/13 |
| 2003/0193777 A1 * | 10/2003 | Friedrich et al. ............. 361/687 |
| 2006/0184935 A1 * | 8/2006 | Abels et al. ........................ 718/1 |
| 2007/0078635 A1 * | 4/2007 | Rasmussen et al. ............. 703/1 |
| 2007/0183129 A1 * | 8/2007 | Lewis et al. .................... 361/724 |
| 2009/0078401 A1 * | 3/2009 | Cichanowicz ................ 165/299 |

(Continued)

OTHER PUBLICATIONS

Pierre Hansen, Nenad Mladenovic; A Separable Approximation Dynamic Programming Algorithm for Economic Dispatch With Transmission Losses, Yugoslav Journal of Operations Reseach, 158.*
Pierre Hansen, Nenad Mladenovic, A Separable Approximation Dynamic Programming Algorithm for Economic Dispatch with Transmission Losses, Yougoslav Journal of Operations Research, 2002.*

(Continued)

*Primary Examiner* — Justin M Pats
*Assistant Examiner* — Venay Puri
(74) *Attorney, Agent, or Firm* — Mannava & Kang, P. C.

(57) ABSTRACT

In a method of determining cooling resource capacity allocations for resource units in a shared environment for optimized operations, cost parameters associated with operating the resource units in at least one of delivering and receiving cooling resources are identified, one or more constraints associated with operating the resource units are identified, in which at least one of the one or more constraints comprises meeting at least a total cooling demand of components in the shared environment, a cost function that correlates the plurality of identified cost parameters is developed, a minimized cost function is solved for through application of a Lagrange multiplier subject to the identified one or more constraints, and cooling resource capacity allocations for the resource units that result in optimized operations in the shared environment based upon the minimized cost function solution are determined.

18 Claims, 7 Drawing Sheets

(56) References Cited

U.S. PATENT DOCUMENTS

| | | | |
|---|---|---|---|
| 2009/0138313 A1* | 5/2009 | Morgan et al. | 705/8 |
| 2009/0201293 A1* | 8/2009 | Tung et al. | 345/440 |
| 2009/0293022 A1* | 11/2009 | Fries | 716/2 |
| 2009/0302124 A1* | 12/2009 | Dawson et al. | 236/49.3 |
| 2010/0010678 A1* | 1/2010 | Dawson et al. | 700/276 |

OTHER PUBLICATIONS

Data Center Airflow Modeling, Cool Sim, 2008.*

Hansen, P. et al., A Seperable Approximation Dynamic Programming Algorithm for Economic Dispatch with Transmission Losses, Yugoslav Journal of Operations Research, Dec. 2002.

\* cited by examiner

COOLING RESOURCE CAPACITY ALLOCATION BASED ON OPTIMIZATION OF COST FUNCTION WITH LAGRANGE MULTIPLIERS

CROSS-REFERENCES

The present application shares some common subject matter with PCT Application Serial No. PCT/US08/68788, entitled "Cooling Medium Distribution Over A Network Of Passages", filed on Jun. 30, 2008, copending and commonly assigned U.S. patent application Ser. No. 12/260,704, entitled "Virtual Cooling Infrastructure", filed on Oct. 29, 2008, and U.S. Pat. No. 7,031,870 to Sharma et al., entitled "Data Center Evaluation Using an Air Re-Circulation Index", filed on May 28, 2004, the disclosures of which are hereby incorporated by reference in their entireties.

BACKGROUND

There has been a substantial increase in the number of data centers, which may be defined as locations, for instance, rooms that house computer systems arranged in a number of racks. The computer systems are typically designed to perform jobs such as, providing Internet services or performing various calculations. In addition, data centers typically include cooling systems to substantially maintain the computer systems within desired thermodynamic conditions.

The power required to transfer the heat dissipated by components, such as, computer systems, in the racks to the cool air contained in the data center is generally equal to about 10 percent of the power needed to operate the components. However, the power required to remove the heat dissipated by a plurality of racks in a data center is generally equal to about 50 percent of the power needed to operate the components in the racks. The disparity in the amount of power required to dissipate the various heat loads between racks and data centers stems from, for example, the additional thermodynamic work needed in the data center to cool the air. In one respect, racks are typically cooled with fans that operate to move cooling fluid, for instance, air, conditioned air, etc., across the heat dissipating components; whereas, data centers often implement refrigeration cycles to cool heated return air. The additional work required to achieve the temperature reduction, in addition to the work associated with moving the cooling fluid in the data center and the condenser, often add up to the 50 percent power requirement. As such, the cooling of data centers presents problems in addition to those faced with the cooling of the racks.

Conventional data centers are typically cooled by operation of one or more computer room air conditioning (CRAC) units, which consume relatively large amounts of energy. In some instances, conventional CRAC units do not vary their cooling fluid output based on the distributed needs of the data center, but instead, these CRAC units generally operate at or near a maximum compressor power even when the heat load is reduced inside the data center. In other instances, the CRAC units are operated based upon the time of day or the current demand level. Consequently, conventional cooling systems often incur greater amounts of operating expenses than may be necessary to sufficiently cool the components contained in the racks of data centers.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein is a cooling resource allocator and a method of determining cooling resource capacity allocations for resource units in a shared environment for optimized operations. Generally speaking, the cooling resource allocator and method disclosed herein determines the cooling resource capacity allocations for resource units in a shared environment that minimizes one or more cost parameters of the resource units. As discussed herein below, the cost parameter(s) include costs that are based upon at least one of reliability, economics, stability, etc. In addition, the resource units may be operated at the determined cooling resource capacity allocations.

Through implementation of the cooling resource allocator and method disclosed herein, a comprehensive cost model for independent operation of the resource units may be combined with a delivery loss model for the actual supply of cooling resources to a location of demand to create a composite model for optimization. In addition, decisions on how to allocate cooling resource capacities for multiple resource units are based upon optimization cycles and redistribution of capacities to address the total demand in a given period of time. In one regard, the decisions may be made proactively as cooling demands are predicted to change. Thus, by way of particular example, the cooling resource allocator and method disclosed herein are able to determine the capacity allocations for a plurality of air movers in a data center, such that, the air movers are able to deliver a sufficient amount of cooling resources for a total demand in the data center, while substantially minimizing one or more cost functions associated with operating the air movers.

Figure 1:
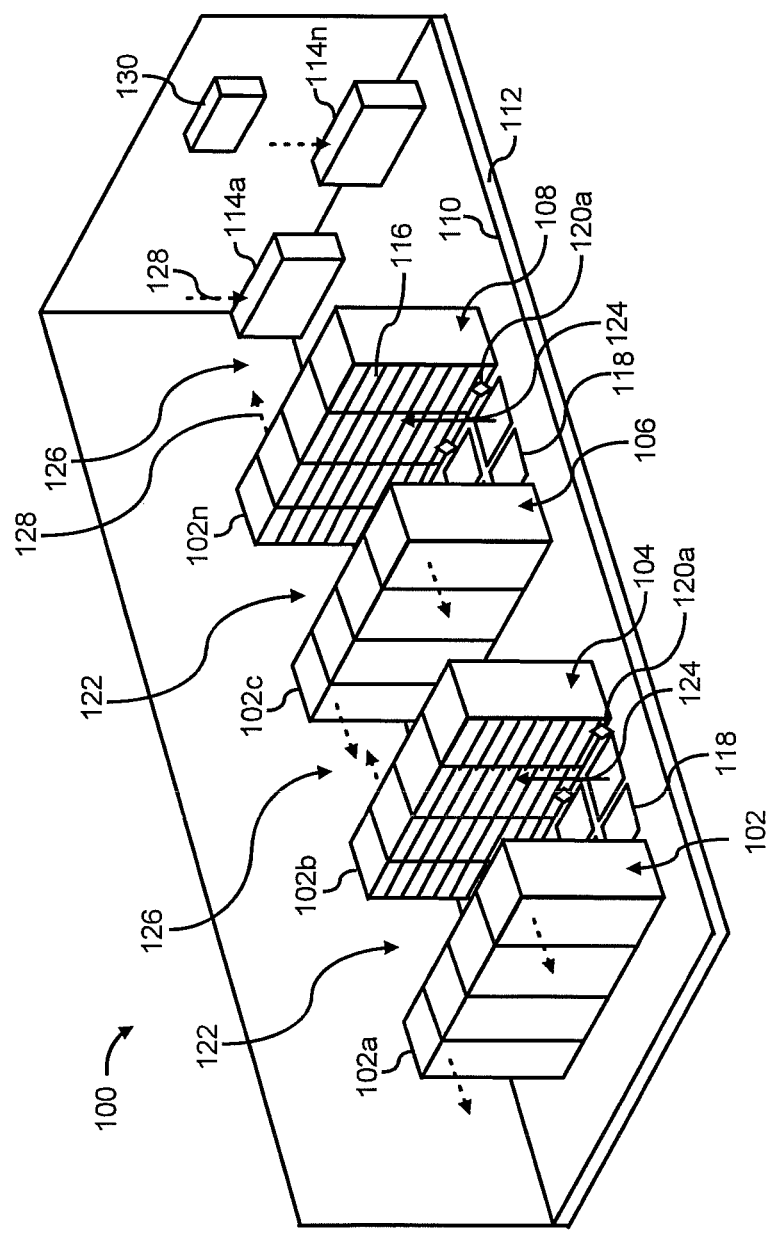
FIG. 1 shows a simplified perspective view of a section of a room, such as a data center, which may employ various examples of the invention, according to an embodiment of the invention.

With reference first to FIG. 1, there is shown a simplified perspective view of a section of a room 100, such as a data center, which may employ various examples of the invention. It should be readily apparent that the room 100 depicted in FIG. 1 represents a generalized illustration and that other components may be added or existing components may be removed or modified without departing from a scope of the room 100 described herein. For example, the room 100 may include any number of racks and various other components. In addition, it should also be understood that heat generating/dissipating components may be located in the room 100 without being housed in racks.

The room 100 is depicted as having a plurality of racks 102a-102n, where "n" is an integer greater than one. The racks 102a-102n may comprise, for instance, electronics cabinets, aligned in parallel rows. Each of the rows 102-108 of racks 102a-102n is shown as containing four racks 102a-102n positioned on a raised floor 110. A space 112 beneath the raised floor 110 may function as a plenum for delivery of resources, in this instance, cool air, from one or more air movers 114a-114n, where "n" is an integer greater than one, to the racks 102a-102n. The air movers 114a-114n may comprise cooling units, such as, one or more of CRAC units, chillers, pumps, adsorption systems, etc.

As further shown in FIG. 1, the air cooled by the air movers 114a-114n is delivered (as shown by the arrows 124) from the space 112 to the racks 102a-102n through airflow delivery devices 118 located between some or all of the racks 102a-102n. In addition, the air contained in the space 112 may include air supplied by more than one air mover 114a-114n. Thus, characteristics of the air, such as, temperature, pressure, flow rate, etc., at various locations in the space 112 may substantially be affected by one or more of the air movers 114a-114n. In this regard, characteristics of the air at various areas in the space 112 and the air supplied to the racks 102a-102n may vary, for instance, if the temperatures or the flow rates of the air supplied by these air movers 114a-114n due to mixing of the air. In other words, characteristics of the air supplied through the airflow delivery devices 118 may differ for various airflow delivery devices 118 due to the differences in the characteristics of the air at the various locations in the space 112.

In addition, differences in the characteristics of the air may be based upon various factors, including, the proximities of the air movers 114a-114n to the airflow delivery devices 118, obstacles in the space 112, airflow patterns in the room 100, etc. The air movers 114a-114n may thus have particular levels of influence over the airflow delivery devices 118 depending upon these various factors. By way of example, an air mover 114a may have a greater level of influence over an airflow delivery device 118 that is in relatively closer proximity to the air mover 114a than an airflow delivery device 118 that is relatively farther away from the air mover 114a.

As further shown in FIG. 1, the cooled airflow 124 enters into cool aisles 122, flows through the components 116 or racks 102a-102n, becomes heated air 128, which flows into hot aisles 126, and then flows into the air movers 114a-114n. The cooling units 114a-114n operate the heated air 128 in any of a number of conventional manners and supply the cooled air 124 back into the room 100 through the vent tiles 118.

According to an embodiment, cooling resource capacity allocations for each of the air movers 114a-114n that results in substantially optimized operations in the shared environment, such as the room 100, are determined through application of a comprehensive cost function for independent operation of each of the air movers 114a-114n. The comprehensive cost function factors in delivery losses for the actual supply of cooling resources to the location of demand, such as, the racks 102a-102n or the components 116 housed therein to create a composite cost function. The cooling resource capacity allocations for each of the air movers 114a-114n may be considered as resulting in optimized operations when, for instance, most or all of the components 116 receive sufficient cooling provisioning, such as, air, cooling fluid, refrigerant, etc., while maintaining the energy consumption levels of the air movers 114a-114n at desired or substantially optimized levels. The components 116 may, for instance, be considered as receiving sufficient levels of cooling resources when the components 116 are able to be operated at relatively high levels of reliability and stability, which may be set as predefined levels of reliability and stability. Various manners in which the cooling resource capacity allocations for the air movers 114a-114n may be determined in accordance with embodiments of the invention are described in greater detail herein below.

According to an embodiment, a controller 130 is configured to determine the cooling resource capacity allocations for the air movers 114a-114n. In addition, the controller 130 may iteratively determine over a predetermined period of time, whenever the components 116 in the room 100 are operational, at predetermined intervals of time, as new workloads are received, etc. The cooling resource capacity allocations may be determined iteratively to substantially continuously determine allocations that result in substantially optimized operations as conditions change in the room. In addition or alternatively, the controller 130 may be configured to control the air movers 114a-114n to operate at the determined settings. In this example, the controller 130 may comprise the capacity manager described in U.S. patent application Ser. No. 12/260,704.

Although the controller 130 is illustrated in FIG. 1 as comprising a component separate from the components 116 housed in the racks 102a-102n, the controller 130 may comprise one or more of the components 116 without departing from a scope of the room 100 disclosed herein. In addition, or alternatively, the controller 130 may comprise software configured to operate on one or more computing devices, for instance, the component(s) 116.

Figure 2:
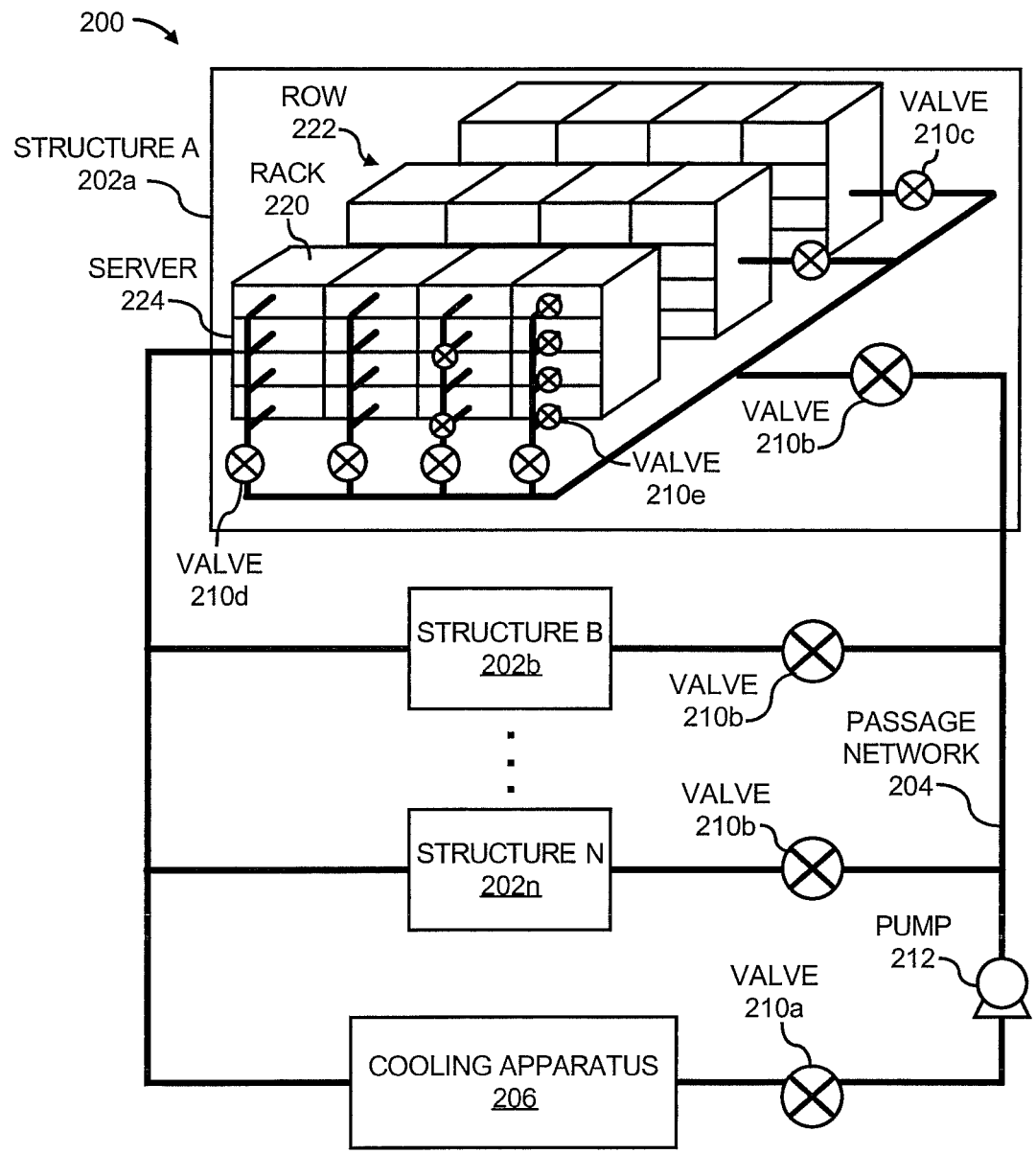
FIG. 2 illustrates a simplified schematic diagram of a plurality of structures which may employ various examples of the invention, according to an embodiment of the invention.

Turning now to FIG. 2, there is shown a simplified schematic diagram 200 of a plurality of structures 202a-202n, which may employ various examples of the invention, according to an example. It should be readily apparent that the diagram 200 depicted in FIG. 2 represents a generalized illustration and that other components may be added or existing components may be removed or modified without departing from a scope of the diagram 200 described herein.

As shown, a cooling resource, in this case a cooling medium, is distributed to multiple areas in at least one structure 202a-202n through a network of passages 204. The structures 202a-202n may comprise rooms similar to the room 100 depicted in FIG. 1. The passages 204 may comprise, for instance, one or more of conduits, pipes, ducts, channels, tubes, etc. The network of passages 204 is depicted as forming a loop through which cooling medium flows, such as, a hydronics loop. The network of passages 204 may include one or more pumps 212 configured to pressurize the cooling medium and thereby cause the cooling medium to flow in a desired direction through the network of passages 204. The cooling medium may comprise, for instance, chilled water, refrigerant, water at reduced pressure, or other reasonably suitable medium that may be employed to absorb heat from one location and convey the heat to another location.

According to an example, the cooling medium distribution system depicted in the diagram 200 is configured to manage the distribution of a cooling medium to one or more structures 202a-202n (FIG. 2), where "n" is an integer equal to or greater than one. In addition, or alternatively, the cooling medium distribution system 100 is configured to control the distribution of the cooling medium to various locations within the one or more structures 202a-202n, such as rows of racks 222, individual racks 220, individual servers 224, air movers 114a-114n (not shown), etc.

In any regard, the network of passages 204 generally enables the cooling medium to flow through the structures 202a-202n and absorb heat generated by the components, such as, servers, monitors, hard drives, power supplies, network switches, air movers 114a-114n, etc., contained in the structures 202a-202n. The network of passages 204 is also configured to interact with a cooling apparatus 206 that operates to remove heat from the cooling medium and thus reduce the temperature of the cooling medium before being supplied back into the structures 202a-202n. The cooling apparatus 206 may comprise any reasonably suitable mechanism or system designed to cool the cooling medium. Examples of suitable cooling apparatuses 206 include, for instance, refrigeration loops, air-to-liquid heat exchangers, liquid-to-liquid heat exchangers, etc.

In instances where the cooling apparatus 206 comprises a refrigeration system, the cooling apparatus 206 may include a compressor, condenser, and an expansion valve configured to directly cool the cooling medium. In other instances, the cooling apparatus 206 may comprise a heat exchanger through which heat is transferred from the cooling medium to a second cooling medium in a secondary heat exchanger loop (not shown). In the latter instances, the secondary heat exchanger loop may itself comprise a refrigeration loop, a water-chiller apparatus, etc., having a heat exchanger through which heat is transferred from the cooling medium in the cooling apparatus 206 to the cooling medium in the secondary heat exchanger loop.

As further depicted in FIG. 2, the cooling medium flow through the network of passages 204 is controlled by a plurality of valves 210a-210n, where "n" is an integer equal to or greater than one and does not necessarily equal other values of "n" cited throughout the present disclosure. In addition, the valves 210a-210n may be manipulated by respective actuators (not shown), which may each be configured to manipulate flow through one or more valves 210a-210n. Various manners in which the valves 210a-210n may be operated to control the flow of the cooling medium to desired locations are described in the PCT/US08/68788 application for patent.

According to an embodiment, optimum cooling resource capacity allocations for each of the valves 210a-210n that results in substantially optimized operations in the shared environments, such as, the structures 202a-202n, are determined through application of a comprehensive cost function for independent operation of each of the valves 210a-210n. The comprehensive cost function factors in delivery losses the actual supply of cooling resources to the location of demand, such as, the racks 220, the components 116 housed therein, air movers 114a-114n, etc., to create a composite cost function. The cooling resource capacity allocations for the valves 210a-210n may be considered as being optimized when, for instance, most or all of the components 116 receive sufficient cooling resources while maintaining the energy consumption levels of the cooling apparatus 206 and/or the air movers 114a-114n at desired or substantially optimized levels. The components 116 may, for instance, be considered as receiving sufficient levels of cooling resources when the components 116 are able to be operated at relatively high levels of reliability and stability, which may be set as predefined levels of reliability and stability. Various manners in which the optimum settings may be determined in accordance with embodiments of the invention are described in greater detail herein below.

According to an embodiment, a controller (not shown), such as the controller 130 depicted in FIG. 1, is configured to determine the cooling resource capacity allocations for the valves 210a-210n. The controller may be operated in various manners as discussed above with respect to the controller 130 depicted in FIG. 1.

Although particular reference has been made to the shared environments depicted in FIGS. 1 and 2, it should be understood that the principles of the invention disclosed herein may be practiced in various other types of environments in which cooling resources are shared among multiple components and/or locations.

Figure 3:
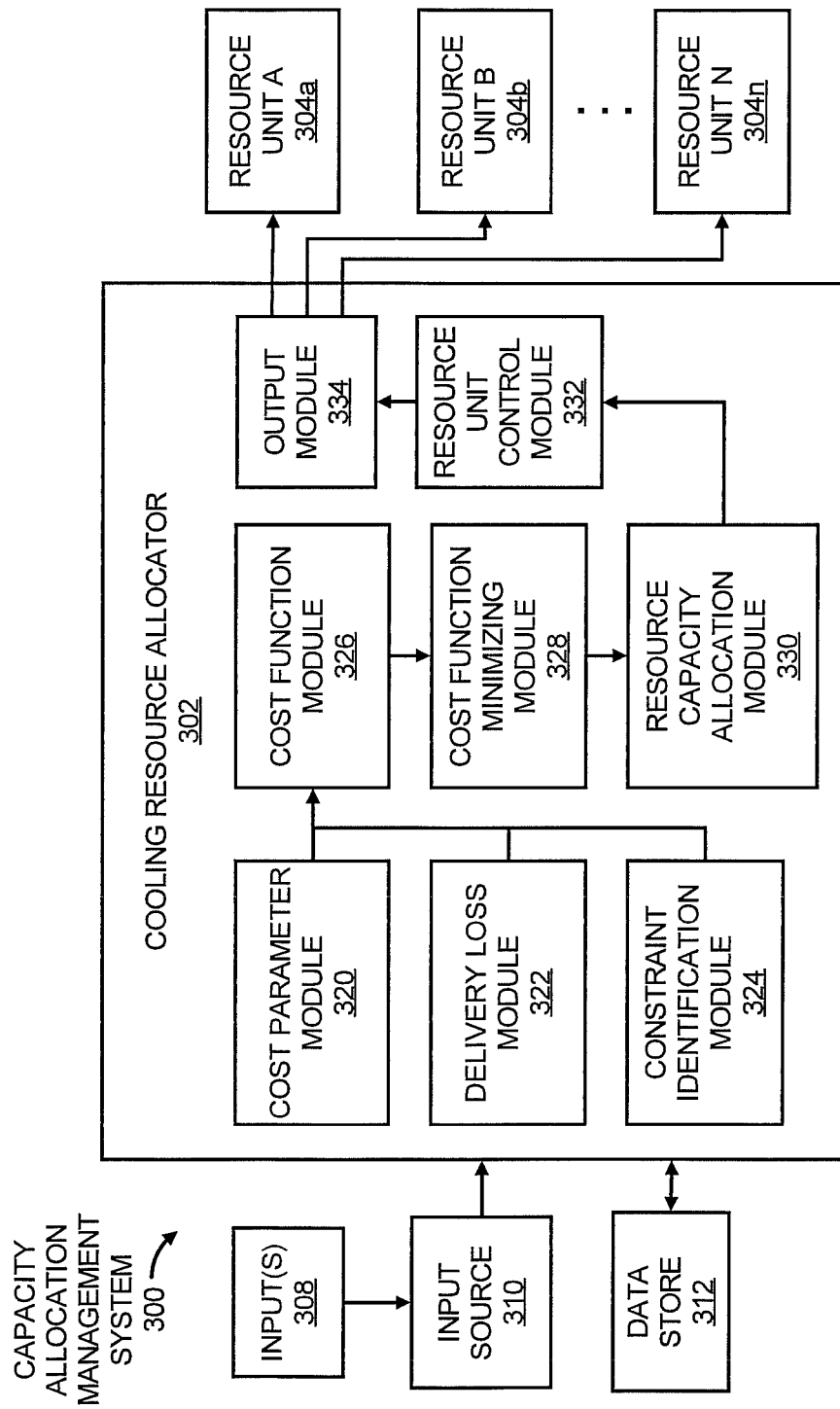
FIG. 3 shows a simplified block diagram of a system for managing cooling resource capacity allocations or resource units in a shared environment, according to an embodiment of the invention.

With reference now to FIG. 3, there is shown a simplified block diagram of a system 300 for managing cooling resource capacity allocations of resource units in a shared environment, according to an example. It should be understood that the system 300 may include additional elements and that some of the elements described herein may be removed and/or modified without departing from a scope of the system 300.

As shown, the system 300 includes a cooling resource allocator 302, which may comprise software, firmware, and/or hardware and is configured to perform a number of operations in determining the cooling resource capacity allocations of a plurality of resource units 304a-304n. The resource units 304a-304n may comprise any apparatus configured to receive and/or deliver a cooling resource, such as, cooled airflow, cooled liquid, a refrigerant, a gas, etc. By way of example, the resource units 304a-304n may comprise the air movers 114a-114n depicted in FIG. 1 and/or the valves 210a-210n, pump 212, cooling apparatus 206, etc., depicted in FIG. 2. In this regard, the resource units 304a-304n generally comprise apparatuses that directly and/or indirectly provide cooling resources to one or more heat generating components. Examples of resource units 304a-304n that provide indirect cooling resources include apparatuses that provide cooling resources, such as, refrigerant, chilled water, water at reduce pressure, etc., to the air movers 114a-114n.

Generally speaking, the cooling resource allocator 302 is configured to determine cooling resource capacity allocations for the resource units 304a-304n that results in substantially optimized operations of the resource units 304a-304n in providing adequate and/or desired levels of heat load removal from a shared environment. The heat load demands generally include heat loads generated by computer equipment, such as servers, networking equipment, storage devices, etc., components contained in the computer equipment, such as processors, power supplies, disk drives, etc., manufacturing equipment, such as drills, presses, robots, forming machines, etc., as well as any other heat generating elements, including, humans or other animals. The heat load demands may also include heat loads generated by combinations of elements, such as, all of the servers housed in a single rack, all of the fabrication machines located in a particular area, etc.

The operations of the resource units 304a-304n may be considered to be substantially optimized when the costs associated with operating the resource units 304a-304n to meet the heat load removal demands are substantially minimized. The costs may include one or more of reliability costs, economic costs, stability costs, etc., associated with operating the resource units 304a-304n. For instance, a plurality of these costs may be weighed according to one or more factors to form a composite cost parameter According to an example, the cooling resource allocator 302 is configured to proactively determine the cooling resource capacity allocations of the resource units 304a-304n. As such, instead of waiting until conditions have changed in the shared environment, the cooling resource allocator 302 is configured to determine how the conditions, such as, heat load demands, are predicted to change and to proactively determine the cooling resource capacity allocations based upon the predicted changes.

As shown in FIG. 3, the cooling resource allocator 302 is configured to receive one or more inputs 308 through an input source 310. The input source 310 may comprise a computing device, a storage device, a user-input device, such as, a keyboard, mouse, etc., and the like, through which data may be inputted into the cooling resource allocator 302. Thus, for instance, the cooling resource allocator 302 may receive input from one or more of the components 116 (FIG. 1), a workload manager for the components 116, etc. In addition, the cooling resource allocator 302 and the input source 310 may form part of the same or different computing device.

The data inputted from or through the input source 310 may include, for instance, workload demand inputs (heat loads), cooling system component descriptions, workload constraints, cooling system component constraints, etc. The data may also include costs, which may be economic and/or environmental costs, associated with cooling the heat loads generated in performing the workloads. The cooling resource allocator 302 may utilize the data as the data is received and/or may store the data in a data store 312, which may comprise a combination of volatile and non-volatile memory, such as DRAM, EEPROM, MRAM, flash memory, and the like. In addition, or alternatively, the data store 312 may comprise a device configured to read from and write to a removable media, such as, a floppy disk, a CD-ROM, a DVD-ROM, or other optical or magnetic media.

The cooling resource allocator 302 may output data pertaining to the determined cooling resource capacity allocations for the resource units 304a-304n. The data may be outputted to, for instance, a display configured to display the determined capacity allocations, a fixed or removable storage device on which the determined capacity allocations are stored, a connection to a network over which the identified set of components may be communicated, etc. In addition, or alternatively, the cooling resource allocator 302 may output instructions for the resource units 304a-304n to operate at the determined capacity allocations. The instructions may be sent directly to the resource units 304a-304n or to a controller of the resource units 304a-304n, such as, for instance, the capacity manager described in U.S. patent application Ser. No. 12/260,704.

The cooling resource allocator 302 is depicted as including a cost parameter module 320, a delivery loss module 322, a constraint identification module 324, a cost function module 326, a cost function minimization module 328, a resource capacity allocation module 330, a resource unit control module 332, and an output module 334.

In instances where the cooling resource allocator 302 comprises software, the cooling resource allocator 302 may be stored on a computer readable storage medium in any reasonably suitable descriptive language and may be executed by a processor of a computing device (not shown). In these instances, the demand modules 320-334 may comprise software modules or other programs or algorithms configured to perform the functions described herein below.

In addition, or alternatively, the cooling resource allocator 302 may comprise firmware or hardware components. In these instances, the cooling resource allocator 302 may comprise a circuit or other hardware apparatus configured to perform the functions described herein. In addition, the modules 320-334 may comprise one or more of software modules and hardware modules, such as one or more circuits.

Figure 4A:
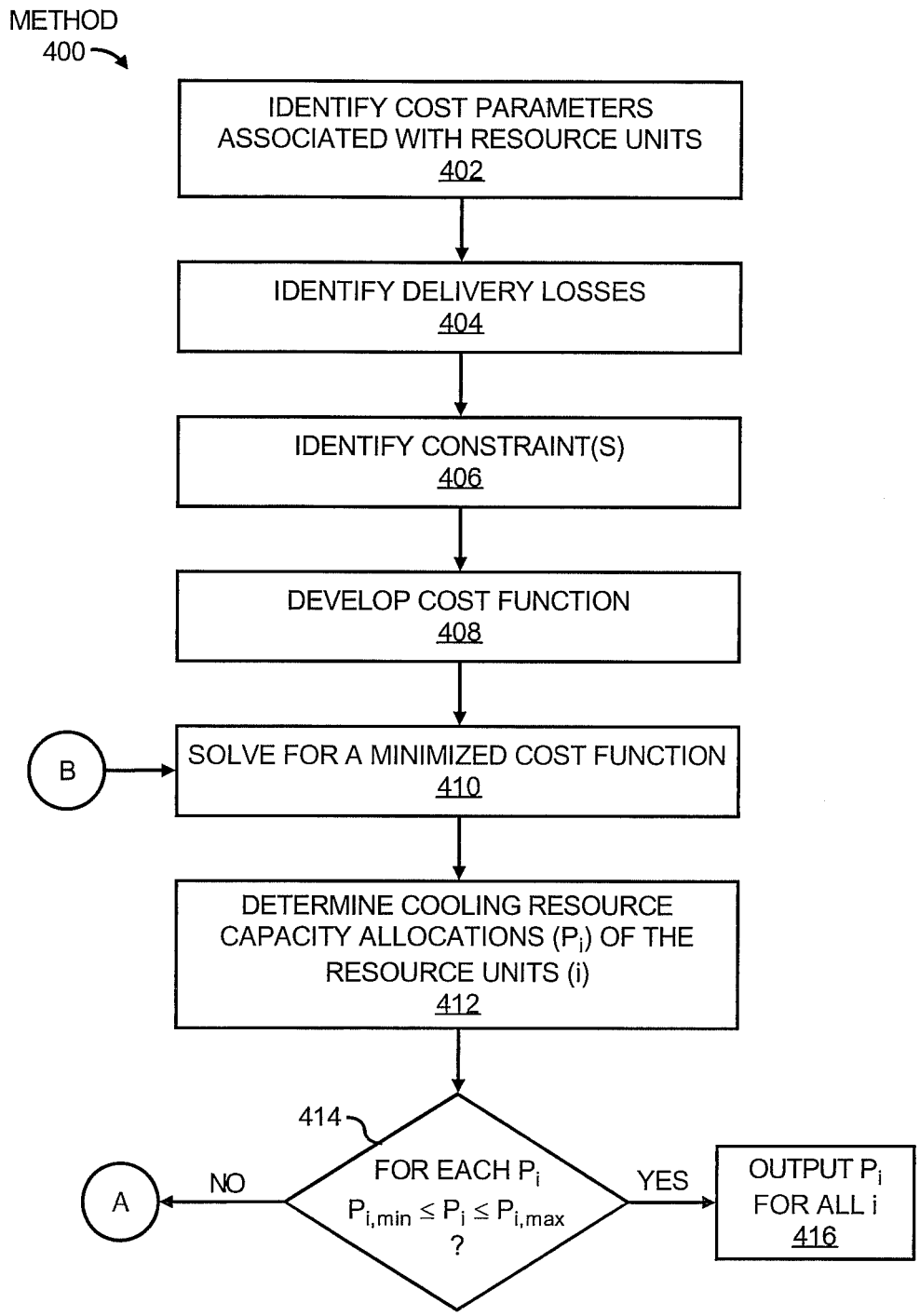
FIGS. 4A, 4B and 4C, collectively, show a flow diagram of a method of determining cooling resource capacity allocations for resource units in a shared environment for optimized operations, according to an embodiment of the invention.
Figure 4B:
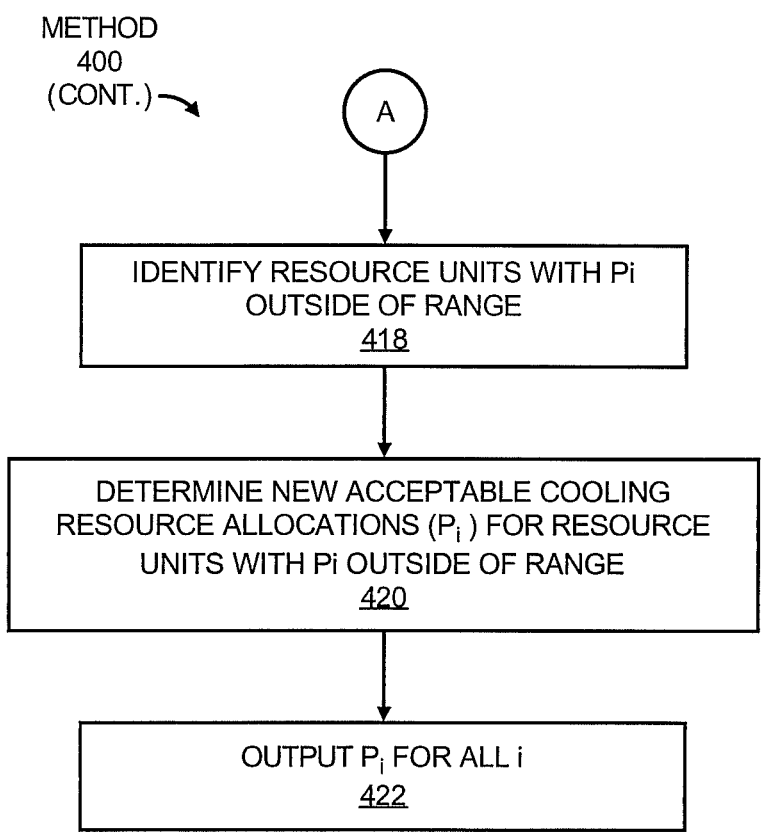

Various operations that the modules 320-334 perform will be described with respect to the following flow diagram of a method 400 depicted in FIGS. 4A and 4B. FIGS. 4A and 4B, collectively, show a flow diagram of a method 400 of determining cooling resource capacity allocations for resource units in a shared environment for optimized operations, according to an example. It should be apparent to those of ordinary skill in the art that the method 400 represents a generalized illustration and that other steps may be added or existing steps may be removed, modified or rearranged without departing from a scope of the method 400.

The description of the method 400 is made with reference to the cooling resource capacity allocation management system 300 illustrated in FIG. 3, and thus makes reference to the elements cited therein. It should, however, be understood that the method 400 is not limited to the elements set forth in the management system 300. Instead, it should be understood that the method 400 may be practiced by a system having a different configuration than that set forth in the management system 300.

At step 402, cost parameters associated with a plurality of resource units 304a-304n are identified. More particularly, a processor may invoke or implement the cost parameter module 320 to identify the cost parameters. The cost parameters of the resource units 304a-304n may be based upon one or more of reliability costs, economic costs, stability costs, etc., associated with either or both of delivering and receiving cooling resources. In addition, the cost parameters for the resource units 304a-304n may comprise an input 308 inputted into the cooling resource allocator 302 through the input source 310 and may be stored in the data store 312. Thus, for instance, a user may input the cost parameters for each of the resource units 304a-304n or for groups or categories of the resource units 304a-304n into the cooling resource allocator 302. Alternatively, the cooling resource allocator 302 may access a database containing this information to identify the cost parameters. Generally speaking, the cost parameters generally define desired envelopes of operation for each of the resource units 304a-304n, which may be the same or differ for each of the resource units 304a-304n.

Reliability costs may include, for instance, the reliabilities of the resource units 304a-304n at different operating levels, which may be defined by the resource unit 304a-304n manufacturers or through other testing processes. Thus, for instance, a resource unit 304a may have a relatively high reliability cost when the resource unit 304a is operated at a relatively high capacity level.

Economic costs may include, for instance, the monetary costs associated with operating the resource units 304a-304n, such as, electricity or other resource costs. Thus, for instance, a resource unit 304a may have a relatively high monetary cost when the resource unit 304a is operating at a relatively low efficiency level. As such, for example, a resource unit 304a that operates at a relatively high efficiency level may have relatively lower monetary costs as compared with a resource unit 304b that operates at a relatively low efficiency level.

Stability costs may include, for instance, the stabilities of the resource units 304a-304n when operating at different capacity levels, which may be defined by the resource unit 304a-304n manufacturers or through other testing processes. Thus, for instance, a resource unit 304a may have a relatively high stability cost when the resource unit 304a is operated at a relatively high capacity level.

Additional cost parameters may include, for instance, costs associated with control characteristics and efficiency profiles of each of the resource units 304a-304n.

At step 404, losses in the delivery of the cooling resources to and/or from the resource units 304a-304n are identified. More particularly, a processor may invoke or implement the delivery loss module 322 to identify the delivery losses. The delivery losses may include, for instance, heat transfer losses, air leakages, pressure drops in the vents, heated airflow recirculation into the cooling resources, etc. The delivery losses may also be defined upon one or more cooling infrastructure constraints, such as, whether the cooling resources are delivered through a floor plenum or a ceiling plenum, whether the air movers 114a-114n have variable frequency or non-variable frequency motors, etc.

According to an example, the delivery losses may be defined as the amount of cooling resources that are lost from the time that the cooling resources are supplied from a resource unit 304 until the cooling resources are delivered to a component 116 or a rack 102a housing the component 116 (FIG. 1). Thus, by way of example, the delivery losses may be defined as the increase in temperature of cooling resources as measured from when the cooling resources are supplied from a resource unit 304a to when the cooling resources are received at a component 116 or a rack 102a. Although the delivery losses may be determined through application of other metrics, the effects of heated airflow recirculation on the cooling resources may be determined through application of a supply heat index (SHI) described in U.S. Pat. No. 7,031,870.

According to an example, the delivery loss module 322 is configured to determine the delivery losses through application of one or more suitable metrics. In another example, the delivery losses may be inputted into the cooling resource allocator 302 through the input source 310. In a further example, the delivery loss module 322 may access a database containing the delivery loss information for each of the resource units 304a-304n or of groups of resource units 304a-304n.

At step 406, one or more constraints associated with operating the resource units 304a-304n are identified. More particularly, a processor may invoke or implement the constraint identification module 324 to identify the one or more constraints associated with operating the resource units 304a-304n. According to an example, one of the constraints on the resource units 304a-304n is that the sum of the cooling resources ($P_i$) outputted by the resource units 304a-304n (i=1 to N) minus the delivery losses ($P_{deliverylosses}$) are to be equivalent to a total cooling demand ($P_{workload}$) of the components 116, which may be denoted by ($\phi$) in the following equation:

$$\phi = 0 = P_{workload} + P_{deliverylosses} - \sum_{i=1}^{N} P_i. \quad \text{Equation (1)}$$

This constraint may be modified such that the sum of the cooling resources ($P_i$) outputted by the resource units 304a-304n (i=1 to N) minus the delivery losses ($P_{deliverylosses}$) is to be at least a predetermined level higher than a total cooling demand ($P_{workload}$) of the components 116 to thereby provide a predetermined level of tolerance in the supply of the cooling resources. In this case, ($\phi$) is considered to have an absolute value that is higher than zero.

The constraint identification module 324 may identify additional constraints with respect to the operation of the resource units 304a-304n. The additional constraints may be directed to identifying appropriate thermal management operational levels, redundancy levels, cost of deployment to satisfy the cooling demand, location/cost/availability of spare capacity, efficiency profiles, etc., of the resource units 304a-304n. The additional constraints may comprise constraints that are inputted into the cooling resource allocator 302 by a user, for instance.

At step 408, a cost function that correlates the cost parameters identified at step 402 is developed, in which, the cost function quantifies at least one of a feasibility, value, etc., of the resource units 304a-304n. More particularly, a processor may invoke or implement the cost function module 326 to develop the cost function. The cost function may be based upon multiple univariate or multivariate objective functions ($F_i$), which may be defined to capture a multitude of other factors, such as, run time operation of units, coefficient of performance, fuel consumption characteristics, operation and maintenance cost characteristics, current fault levels of each resource unit 304a-304n, etc.

The cost function ($F_T$) may be stated mathematically as:

$$F_T = \sum_{i=1}^{N} F_i(P_i). \quad \text{Equation (2)}$$

In Equation (2), $F_i$ denotes the cost parameter rate of the $i^{th}$ resource unit 304a-304n and $P_i$ denotes the cooling resource output of the $i^{th}$ resource unit 304a-304n. A user may input the values of the variables in the cost function ($F_T$) or the cooling resource allocator 302 may access a database containing the variable information to obtain the variable information.

At step 410, a minimized cost function is solved for through application of a Lagrange multiplier, subject to one or more constraints. More particularly, a processor may invoke or implement the cost function minimizing module 328 to solve for the minimized cost function. In other words, the processor may invoke or implement the cost function minimizing module 328 to solve for the minimized cost function by determining the output settings of the resource units 304a-304n that results in the minimized cost function, while satisfying the one or more constraints identified at step 406.

In solving for the minimized cost function, the costing minimizing module 328 may first establish a variational (L) of the cost function as:

$$L = F_T + \lambda \phi. \quad \text{Equation (3)}$$

In Equation (3), $\lambda$ denotes the Lagrange multiplier, $F_T$ denotes the cost function, and $\phi$ denotes the total cooling demand of components in the shared environment. The variation (L) is a Lagrange function that is being minimized and is minimized based upon the choice of the Lagrange multiplier ($\lambda$).

In addition, the cost minimizing module 328 may employ the following constraints in solving for the minimized cost function $F_T$.

$$dF_i/dP_i = \lambda \cdot i. \quad \text{Equation (4)}$$

Equation (4) denotes that the differential equation $dF_i$ over differential equation $dP_i$ is equal to the Lagrange multiplier $\lambda$ for all of the resource units 304a-304n (i), where $P_i$ denotes the cooling resource capacity allocation for the $I^{th}$ resource unit, and $F_i$ denotes the cost parameters for the $i^{th}$ unit, as discussed above. In other words, Equation (4) denotes that the resource units 304a-304n are operating at a certain utilization level, such as, 40, 50, 80, etc., percent and that when an incremental load is applied to any of the resource units 304a, the effect of that incremental load on the resource unit 304a receiving the incremental load is identical to the effect that incremental load would have on any other resource unit 304b-304n.

$$P_{i,min} \le P_i \le P_{i,max} \cdot i. \qquad \text{Equation (5)}$$

Equation (5) denotes that the capacity allocation $P_i$ for each of the resource units 304a-304n (i) must fall between a minimum allowable cooling resource capacity allocation $P_{i,min}$ and a maximum allowable cooling resource capacity allocation $P_{i,max}$ for each of the resource units 304a-304n. The minimum allowable cooling resource capacity allocation $P_{i,min}$ and the maximum allowable cooling resource capacity allocation $P_{i,max}$ for each of the resource units 304a-304n may be determined through any of a variety of manners. For instance, these values may be set based upon user experience and/or standard rules of thumb; physical reality limitations; theoretical, analytical, or computational models of properties, failure, availability, service or performance levels; empirical interpretation and extrapolation of other dependent systems, for instance, if capacity at one resource unit 304a would exceed a value X, then the other resource units 304b-304n would behave in Y fashion, which may result in an acceptable or unacceptable outcome, etc.

$$\sum_{i=1}^{N} P_i - (P_{workload} + P_{deliverylosses}) \le \delta_{constant}. \qquad \text{Equation (6)}$$

Equation (6) denotes that the sum of the capacity allocations $P_i$ of the resource units 304a-304n should be equivalent to or within a negligible bound ($\delta_{constant}$) of the total cooling demand of components in the shared environment $P_{workload}$ minus the total delivery losses in at least one of the delivery and receipt of the resources by the resource units $P_{deliveryloss}$. Although Equations (5) and (6) have been particularly described herein as being implemented in determining the Lagrange multiplier λ, it should be understood that the Lagrange multiplier λ may be determined through use of alternative equations and that these equations may instead be implemented to substantially ensure that the cooling resource capacity allocations ($P_i$) determined for each of the resource units 304a-304n comprises realistic capacity allocations for the resource units 304a-304n.

According to an example, the cost function minimizing module 328 employs an iterative technique, such as, Newton-Raphson, Secant, bisection method, steepest gradient technique, etc., to solve one or more of the Equations (3)-(6). More particularly, the cost function minimizing module 328 employs an iterative technique to solve one or more of the Equations (3)-(6) for the Lagrange multiplier (λ).

At step 412, the cooling resource capacity allocations ($P_i$) for each of the resource units 304a-304n (i) are determined. More particularly, a processor may invoke or implement the resource capacity allocation module 330 to determine the respective cooling resource capacity allocations ($P_i$) for each of the resource units 304a-304n (i). According to an example, the resource capacity allocation module 330 may use the Lagrange multiplier (λ) determined at step 410 in Equation (4) above to determine the individual cooling resource capacity allocations ($P_i$).

At step 414, a determination as to whether the cooling resource capacity allocations ($P_i$) for each of the resource units 304a-304n (i) is within respective minimum and maximum allowable levels ($P_{i,min} \le P_i \le P_{i,max} \cdot i$), which are described in greater detail herein above. More particularly, for instance, a processor may invoke or implement the resource capacity allocation module 330 to make this determination. If the cooling resource capacity allocations ($P_i$) for each of the resource units 304a-304n (i) are within respective minimum and maximum allowable levels ($P_{i,min} \le P_i \le P_{i,max} \cdot i$), the cooling resource capacity allocations ($P_i$) determined at step 412 is outputted as indicated at step 416. The cooling resource capacity allocations ($P_i$) may be communicated out of the cooling resource allocator 302 through operation of the output module 334.

According to an example, the cooling resource capacity allocations ($P_i$) are outputted to a user device, such as, a display, a data storage device, a computing device networked to the computing device performing the method 400, etc. According to another example, the cooling resource capacity allocations ($P_i$) are supplied to a resource unit control module 332 configured to send instructions to the resource units 304a-304n to operate at the allocated cooling resource capacities ($P_i$). As a further example, the cooling resource capacity allocations ($P_i$) are communicated to a capacity manager configured to control operations of the resource units 304a-304n, such as, for instance, the capacity manager described in U.S. patent application Ser. No. 12/260,704. In this example, the capacity manager may allocate capacity from specific resource units 304a-304n for a requested workload to be performed by the components 116.

With reference back to step 414, if one or more of the cooling resource capacity allocations ($P_i$) are outside of their respective minimum and maximum allowable levels ($P_{i,min} \le P_i \le P_{i,max} \cdot i$), the resource units 304a-304n that have been allocated with cooling resource allocations ($P_i$) that are outside of their respective minimum and maximum allowable levels are identified, as indicated at step 418. In addition, at step 420, new acceptable cooling resource allocations ($P_i$) are determined for the identified resource units 304a-304n. That is, new cooling resource allocations ($P_i$) for the resource units 304a-304n that fall between their respective their respective minimum and maximum allowable levels ($P_{i,min} \le P_i \le P_{i,max} \cdot i$) are determined at step 420.

The new cooling resource allocations ($P_i$) for the resource units 304a-304n identified at step 418 may be determined in a number of different manners. For instance, the new cooling resource allocations ($P_i$) may be determined by difference methods, where the out-of-range value is replaced by the closest value within the maximum and minimum range, or through other more sophisticated and iterative techniques, as discussed in greater detail herein below.

Initially, however, at step 422, the cooling resource capacity allocations ($P_i$) for each of the resource units 304a-304n (i) determined at steps 412 and 420 are outputted. By way of example, the cooling resource capacity allocations ($P_i$) may be communicated out of the cooling resource allocator 302 through operation of the output module 334 as discussed in greater detail herein above with respect to step 416.

According to a first example, at step 420, the new acceptable cooling resource allocations ($P_i$) are determined through an iterative process in which the Lagrangian optimization is iterated over various acceptable cooling resource capacity allocations ($P_i$) until an optimized set of cooling resource capacity allocations ($P_i$) is determined for the resource units 304a-304n.

According to an example, the identified resource units 304a-304n may be arbitrarily set to cooling resource allocation levels that are acceptable, such as, for instance, 50% capacity. According to another example the identified resource units 304a-304n may be set to one of the respective minimum and maximum allowable allocations. In either of these examples, the cost functions associated with the different cooling resource allocation levels may be determined and the cooling resource allocation level resulting in the lowest cost function values may be selected for resource units 304a-304n.

Figure 4C:
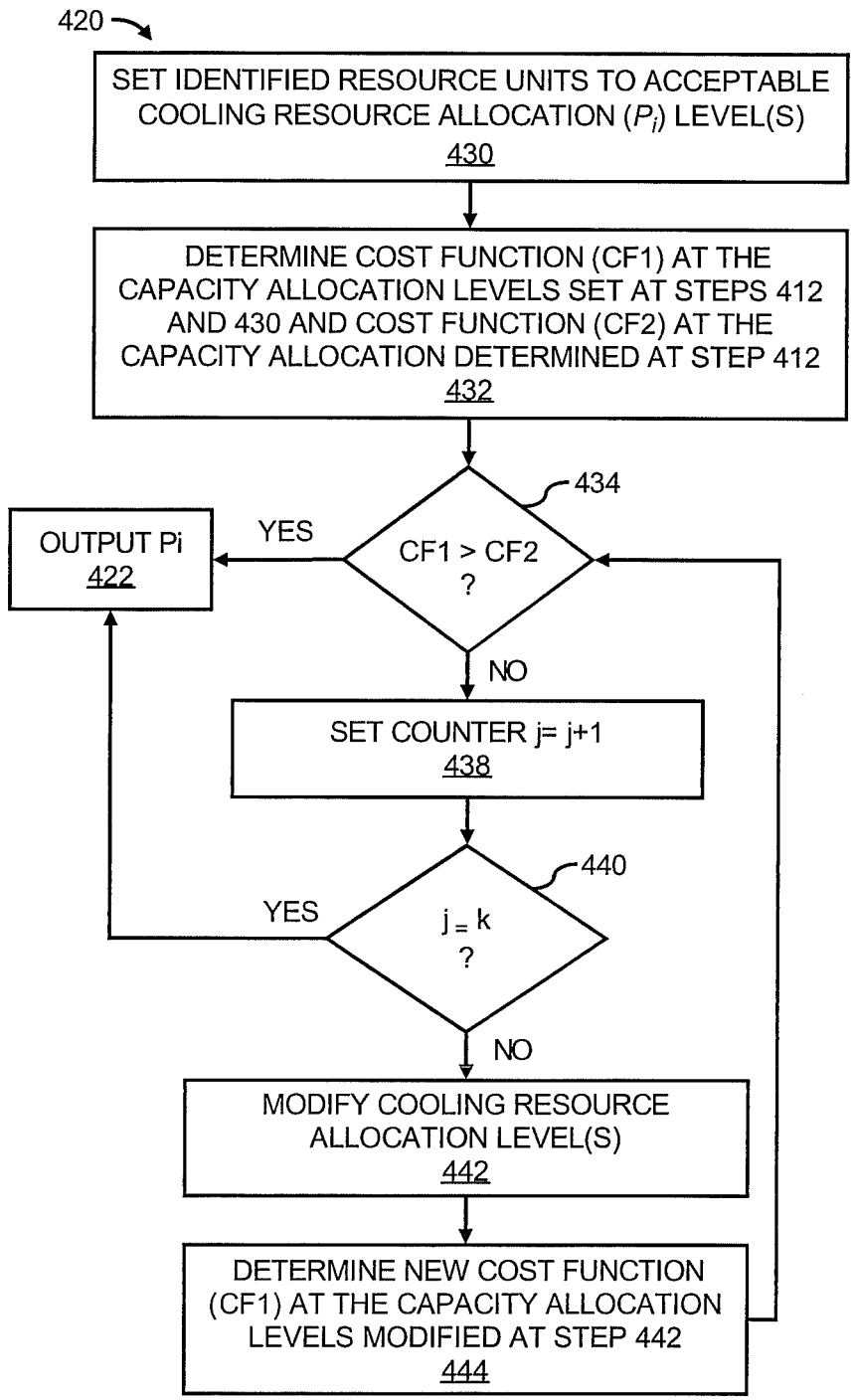

According to a further example, and as shown in FIG. 4C, which depicts a more detailed illustration of step 420 in FIG. 4B, the resource units 304a-304n identified at step 418 as having been assigned cooling resource allocation levels that are outside of the predetermined range are set to acceptable cooling resource allocation levels, as indicated at step 430. The cooling resource allocation levels may be set arbitrarily or to levels close to the respective maximum or minimum resource allocations levels.

At step 432, a cost function (CF1) associated with the resource units 304a-304n having the allocation levels determined at steps 412 and 430 is determined. In addition, a cost function (CF2) associated with the resource units 304a-304n having the allocation levels determined at step 412 is determined. In other words, at step 432, the cost function (CF1) is related to the resource units 304a-304n being forced to have allocation levels that are within a predefined range ($P_{i,min} \leq P_i \leq P_{i,max}$·i) and the cost function (CF2) is related to the resource units 304a-304n having allocation levels that are outside of the predefined range.

At step 434, the CF1 is compared with the CF2 to determine which has a greater value. For instance, if the CF1 is determined to be greater than CF2, then the cooling resource allocations ($P_i$) may be outputted at step 422 as discussed above. In other words, when the CF1 is greater than the CF2, the new acceptable cooling resource allocation is associated with a better cost function and is thus a better operational setting as compared with the settings determined at step 412.

However, if the CF2 is greater than the CF1, a counter j may be increased by 1, as indicated at step 438. In addition, a determination as to whether the counter has exceeded some predetermined number of iterations k is made at step 440. The predetermined number of iterations k may be set arbitrarily, may be based upon a desired amount of time that the method step 420 is to be performed, a desired number of iterations that the method step 420 is to be performed, etc.

If the counter j is determined to have reached the predetermined number of iterations k or after a predetermined amount of time has elapsed, the cooling resource allocations ($P_i$) may be outputted at step 422 as discussed above. If, however, the counter j has not reached the predetermined number of iterations k or before a predetermined amount of time has elapsed, the cooling resource allocation levels for the resource units 304a-304n identified at step 418 may be modified at step 442. By way of example, if a resource unit 304a was set to have an allocation near the maximum allowable level, the resource unit 304a may be set to have an allocation near the minimum allowable level at step 442.

In any regard, at step 444, a new cost function (CF1) is determined at the capacity allocation levels that were modified at step 442. In addition, steps 434, 422, and 438-444 are repeated until a "yes" condition is reached at step 422 or step 440.

According to a yet further example, after determining new acceptable cooling resource allocations for the resource units with cooling resource allocations at step 420, steps 410-416 may be repeated with the cooling resource capacity allocations for those resource units 304a-304n that have been allocated capacities that fall outside of their allowable ranges set at their new acceptable cooling resource allocations. In this regard, a new Lagrange multiplier λ may be determined, which may be employed to determine a new set of cooling resource capacity allocations for the remaining resource units 304a-304n. The new set of cooling resource capacity allocations for the resource units 304a-304n may also be outputted at step 416, as discussed above.

Some or all of the operations set forth in the method 400 may be contained as a utility, program, or subprogram, in any desired computer accessible medium. In addition, the method 400 may be embodied by a computer program, which can exist in a variety of forms both active and inactive. For example, they may exist as software program(s) comprised of program instructions in source code, object code, executable code or other formats. Any of the above may be embodied on a computer readable medium.

Exemplary computer readable storage devices include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 5:
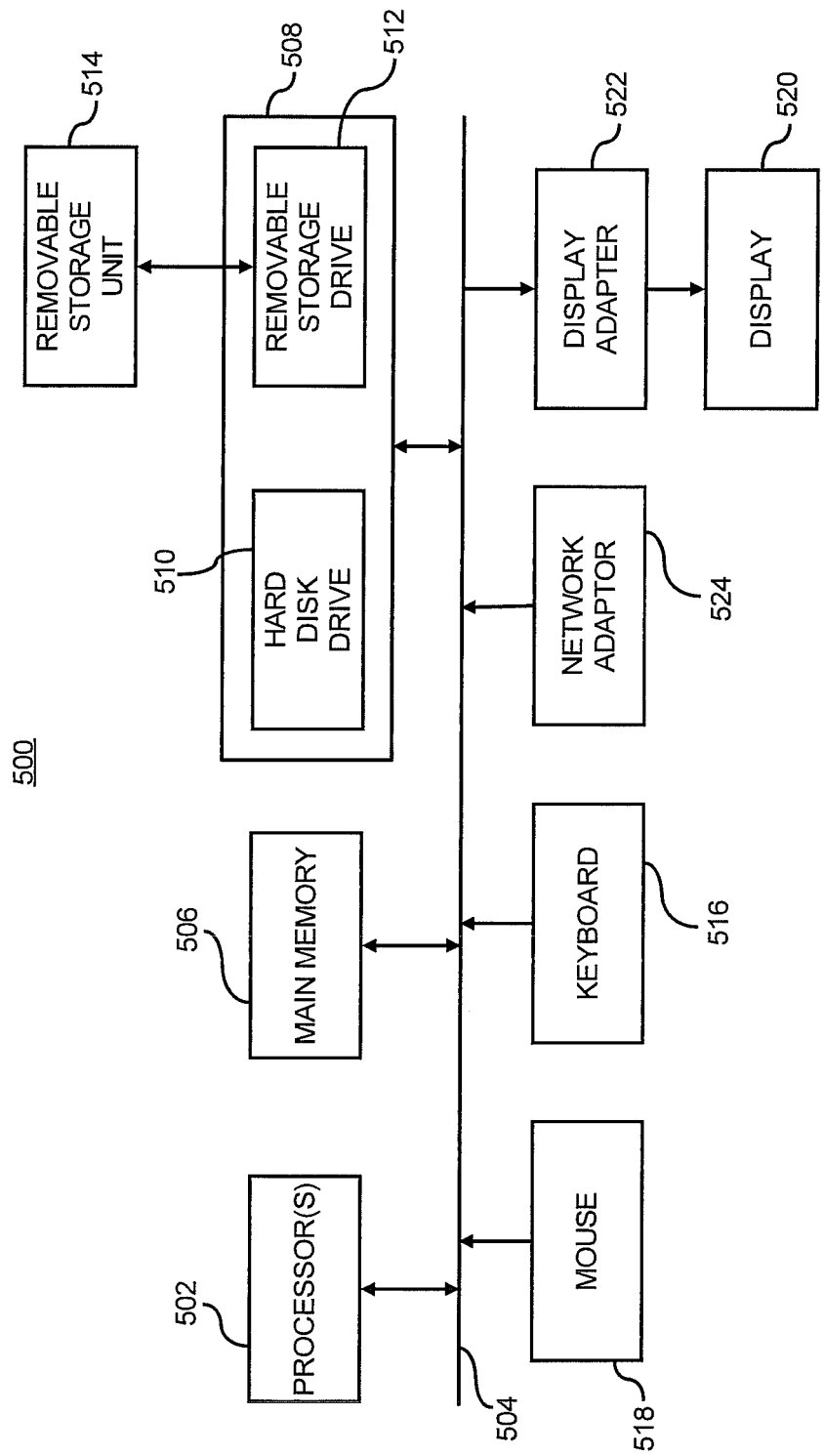
FIG. 5 shows a block diagram of a computing apparatus configured to implement or execute the cooling resource allocator depicted in FIG. 3, according to an embodiment of the invention.

FIG. 5 illustrates a block diagram of a computing apparatus 500 configured to implement or execute the cooling resource allocator 302 depicted in FIG. 3, according to an example. In this respect, the computing apparatus 500 may be used as a platform for executing one or more of the functions described hereinabove with respect to the cooling resource allocator 302.

The computing apparatus 500 includes a processor 502 that may implement or execute some or all of the steps described in the method 400. Commands and data from the processor 502 are communicated over a communication bus 504. The computing apparatus 500 also includes a main memory 506, such as a random access memory (RAM), where the program code for the processor 502, may be executed during runtime, and a secondary memory 508. The secondary memory 508 includes, for example, one or more hard disk drives 510 and/or a removable storage drive 512, representing a floppy diskette drive, a magnetic tape drive, a compact disk drive, etc., where a copy of the program code for the method 400 may be stored.

The removable storage drive 510 reads from and/or writes to a removable storage unit 514 in a well-known manner. User input and output devices may include a keyboard 516, a mouse 518, and a display 520. A display adaptor 522 may interface with the communication bus 504 and the display 520 and may receive display data from the processor 502 and convert the display data into display commands for the display 520. In addition, the processor(s) 502 may communicate over a network, for instance, the Internet, LAN, etc., through a network adaptor 524.

It will be apparent to one of ordinary skill in the art that other known electronic components may be added or substituted in the computing apparatus 500. It should also be apparent that one or more of the components depicted in FIG. 5 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method of determining cooling resource capacity allocations for a cooling unit in a shared environment for optimized operations utilizing resource units, said method comprising steps performed by a processor, said steps comprising:
   identifying cost parameters associated with operating the resource units in at least one of delivering and receiving cooling resources;
   identifying one or more constraints associated with operating the resource units, wherein at least one of the one or more constraints comprises meeting at least a total cooling demand of components in the shared environment;
   identifying delivery loss in at least one of the delivering and receiving of the cooling resources by the resource units, wherein delivery loss is measured from when the cooling resources are supplied from a resource unit to when the cooling resources are received at a component;
   developing a cost function that correlates the plurality of identified cost parameters;
   solving for a minimized cost function through application of a Lagrange multiplier subject to the identified one or more constraints, factoring the total cooling demand of the components and the identified delivery loss in solving for the minimized cost function;
   determining cooling resource capacity allocations for the resource units that result in optimized operations in the shared environment based upon the minimized cost function solution, wherein determining cooling resource capacity allocations comprises predicting changes in the cost parameters, the one or more constraints, and the delivery loss to proactively alter the cooling resource capacity allocations;
   determining if the cooling resource capacity allocations for the resource units are within a predetermined minimum level of tolerance and a predetermined maximum level of tolerance, wherein resource capacity allocations that are outside the predetermined minimum and maximum level of tolerance are replaced by a capacity allocation that is either the minimum resource capacity allocation or the maximum resource capacity allocation; and
   implementing a resource capacity allocation that is greater than the determined resource capacity allocation for each of the resource units in the shared environment.

2. The method according to claim 1, wherein identifying cost parameters further comprises identifying cost parameters pertaining to at least one of reliability costs, economic costs, and stability costs associated with operating the resource units.

3. The method according to claim 1, further comprising:
   communicating the determined optimum cooling resource capacity allocations to a capacity manager configured to instruct the resource units to operate at the determined cooling resource capacity allocations.

4. The method according to claim 1, further comprising:
   identifying the total cooling demand of components in the shared environment; and
   wherein identifying one or more constraints associated with operation of the plurality of resource units further comprises identifying that a sum of the cooling loads is within a predetermined range of the total cooling demand of components in the shared environment.

5. The method according to claim 1, wherein solving for the minimized cost function further comprises solving for the Lagrange multiplier $\lambda$ in the following equation:

$$L = F_T + \lambda \phi,$$

wherein L comprises a variational, $F_T$ comprises the cost function, and $\phi$ comprises the total cooling demand of components in the shared environment.

6. The method according to claim 5, wherein solving for the Lagrange multiplier $\lambda$ comprises solving for the Lagrange multiplier $\lambda$ subject to one or more of the following constraints:

$$dF_i/dP_i = \lambda \cdot i,$$

wherein i denotes the $i^{th}$ resource unit, and $P_i$ denotes the cooling resource capacity allocation for the $i^{th}$ resource unit, and $F_i$ denotes the cost parameters for the $i^{th}$ unit;

$$P_{i,min} \leq P_i \leq P_{i,max} \cdot i,$$

wherein $P_{i,min}$ denotes a minimum allowable cooling resource capacity allocation for the $i^{th}$ resource unit and $P_{i,max}$ comprises a maximum allowable cooling resource capacity allocation for the $i^{th}$ resource unit; and $$\sum_{i=1}^{N} P_i - (P_{workload} + P_{deliverylosses}) \leq \delta_{constant},$$

wherein $P_{workload}$ is the total cooling demand of components in the shared environment, $P_{deliveryloss}$ is the total delivery losses in at least one of the delivery and receipt of the resources by the resource units, and $\delta_{constant}$ is a predetermined constant tolerance value.

7. The method according to claim 6, wherein the $P_{i,min}$ is established based upon thermal management constraints in the shared environment and wherein the $P_{i,max}$ is formulated from capacity constraints of the resource units.

8. The method according to claim 6, wherein determining the cooling resource capacity allocations for the resource units further comprises implementing the determined Lagrange multiplier $\lambda$ in the following equation:

$$dF_i/dP_i = \lambda \cdot i$$

to determine respective cooling resource capacity allocations $P_i$ for each of the resource units.

9. The method according to claim 8, further comprising:
   determining whether the cooling resource capacity allocations $P_i$ of each the resource units satisfies a minimum and maximum constraint as denoted by the equation:

$$P_{i,min} \leq P_i \leq P_{i,max} \cdot i,$$

for each of the resource units;
   in response to the cooling resource capacity allocations of the resource units $P_i$ failing to satisfy the minimum and maximum constraint, determining new acceptable cooling resource allocations for the resource units whose cooling resource capacity allocations fail to satisfy the minimum and maximum constraint.

10. The method according to claim 9, wherein solving for the minimized cost function further comprises solving for the minimized cost function with the failing resource units set to one of the minimum allowable cooling resource capacity allocation and the maximum allowable cooling resource capacity allocation.

11. The method according to claim 1, wherein developing the cost function further comprises developing the cost function $F_T$ to have a form of:

$$F_T = \sum_{i=1}^{N} F_i(P_i),$$

wherein $F_i$ denotes a characteristic cost rate of the $i^{th}$ resource unit and $P_i$ is the optimum cooling resource capacity allocation of the $i^{th}$ resource unit.

12. The method according to claim 1, further comprising:
iteratively solving for the minimized cost function to substantially continuously determine optimum cooling resource capacity allocations as conditions change in the shared environment.

13. The method according to claim 1, further comprising: a capacity manager for controlling the resource units to be allocated with the cooling resource capacity allocations.

14. A cooling resource allocator system comprising:
a memory; and
one or more processors coupled to the memory, the one or more processors configured to
identify cost parameters associated with operating the resource units in at least one of delivering and receiving cooling resources;
identify one or more constraints associated with operating the resource units, wherein at least one of the one or more constraints comprises meeting at least a total cooling demand of components in the shared environment;
develop a cost function that correlates the plurality of identified cost parameters;
identify delivery loss in at least one of the delivering and receiving of the cooling resources by the resource units, wherein delivery loss is measured from when the cooling resources are supplied from a resource unit to when the cooling resources are received at a component to be cooled;
solve for a minimized cost function through application of a Lagrange multiplier subject to the identified one or more constraints and delivery loss;
determine cooling resource capacity allocations for the resource units that result in optimized operations in the shared environment based upon the minimized cost function solution, wherein determining cooling resource capacity allocations comprises predicting changes in the cost parameters, the one or more constraints, and the delivery loss to proactively alter the cooling resource capacity allocations;
determine if the cooling resource capacity allocations for the resource units are within a predetermined minimum level of tolerance and a predetermined maximum level of tolerance, wherein resource capacity allocations that are outside the predetermined minimum and maximum level of tolerance are replaced by a capacity allocation that is either the minimum resource capacity allocation or the maximum resource capacity allocation; and
implement a resource capacity allocation that is greater than the determined resource capacity allocation for each of the resource units in the shared environment.

15. The cooling resource allocator according to claim 14, wherein the one or more processors are further configured to solve for the minimized cost function by solving for the Lagrange multiplier $\lambda$ in the following equation:

$$L = F_T + \lambda \phi,$$

wherein L comprises a variation, $F_T$ comprises the cost function, and $\phi$ comprises the total cooling demand of components in the shared environment; and
wherein the cost function minimizing module is further configured to solve for the Lagrange multiplier $\lambda$ by solving for the Lagrange multiplier $\lambda$ subject to one or more of the following constraints:

$$dF_i/dP_i = \lambda \cdot i,$$

wherein i denotes the $i^{th}$ resource unit, and $P_i$ denotes the cooling resource capacity allocation for the $i^{th}$ resource unit, and $F_i$ denotes the cost parameters for the $i^{th}$ unit;

$$P_{i,min} \leq P_i \leq P_{i,max} \cdot i,$$

wherein $P_{i,min}$ denotes a minimum allowable cooling resource capacity allocation for the $i^{th}$ resource unit and $P_{i,max}$ comprises a maximum allowable cooling resource capacity allocation for the $i^{th}$ resource unit; and $$\sum_{i=1}^{N} P_i - (P_{workload} + P_{deliverylosses}) \leq \delta_{constant},$$

wherein $P_{workload}$ is the total cooling demand of components in the shared environment, $P_{deliveryloss}$ is the total delivery losses in at least one of the delivery and receipt of the resources by the resource units, and $\delta_{constant}$ is a predetermined constant tolerance value.

16. The cooling resource allocator according to claim 15 wherein the one or more processors are further configured to determine the cooling resource capacity allocations for the resource units by implementing the determined Lagrange multiplier $\lambda$ in the following equation:

$$dF_i/dP_i = \lambda \cdot i$$

to determine respective cooling resource capacity allocations $P_i$ for each of the resource units.

17. A non-transitory computer readable storage medium on which is embedded one or more computer programs, said one or more computer programs implementing a method of determining cooling resource capacity allocations for a cooling unit in a shared environment for optimized operations utilizing resource units, said one or more computer programs comprising a set of instructions for:
identifying cost parameters associated with operating the resource units in at least one of delivering and receiving cooling resources;
identifying delivery loss in at least one of the delivering and receiving of the cooling resources by the resource units, wherein delivery loss is measured from when the cooling resources are supplied from a resource unit to when the cooling resources are received at a component to be cooled;
identifying one or more constraints associated with operating the resource units, wherein at least one of the one or more constraints comprises meeting at least a total cooling demand of components in the shared environment;
developing a cost function that correlates the plurality of identified cost parameters;
solving for a minimized cost function through application of a Lagrange multiplier subject to the identified one or more constraints and delivery loss; and
determining cooling resource capacity allocations for the resource units that result in optimized operations in the shared environment based upon the minimized cost function solution, wherein determining cooling resource capacity allocations comprises predicting changes in the cost parameters, the one or more constraints, and the delivery loss to proactively alter the cooling resource capacity allocations;
determining if the cooling resource capacity allocations for the resource units are within a predetermined minimum level of tolerance and a predetermined maximum level of tolerance, wherein resource capacity allocations that are outside the predetermined minimum and maximum level of tolerance are replaced by a capacity allocation that is either the minimum resource capacity allocation or the maximum resource capacity allocation; and implementing a resource capacity allocation that is greater than the determined resource capacity allocation for each of the resource units in the shared environment.

18. The computer readable storage medium according to claim 17, said one or more computer programs further including a set of instructions for:

wherein solving for the minimized cost function further comprises solving for the Lagrange multiplier $\lambda$ in the following equation:

$L = F_T + \lambda \phi,$ wherein L comprises a variational, $F_T$ comprises the cost function, and $\phi$ comprises the total cooling demand of components in the shared environment; and wherein solving for the Lagrange multiplier $\lambda$ comprises solving for the Lagrange multiplier $\lambda$ subject to one or more of the following constraints:

$dF_i/dP_i \lambda \cdot i,$ wherein i denotes the $i^{th}$ resource unit, and $P_i$ denotes the cooling resource capacity allocation for the $i^{th}$ resource unit, and $F_i$ denotes the cost parameters for the $i^{th}$ unit;

$P_{i,min} \leq P_i \leq P_{i,max} \cdot i,$ wherein $P_{i,min}$ denotes a minimum allowable cooling resource capacity allocation for the $i^{th}$ resource unit and $P_{i,max}$ comprises a maximum allowable cooling resource capacity allocation for the $i^{th}$ resource unit; and $$\sum_{i=1}^{N} P_i - (P_{workload} + P_{deliverylosses}) \leq \delta_{constant},$$

wherein $P_{workload}$ is the total cooling demand of components in the shared environment, $P_{deliveryloss}$ is the total delivery losses in at least one of the delivery and receipt of the resources by the resource units, and $\delta_{constant}$ is a predetermined constant tolerance value.

\* \* \* \* \*